V. N. Mitchell.
Carriage Pole.
N° 76,496. Patented Apr. 7, 1868.

Witnesses.
Alex F. Roberts
J. A. Servine

Inventor.
V. N. Mitchell
per Munn & Co
Attorneys

United States Patent Office.

V. N. MITCHELL, OF CONCORD, NORTH CAROLINA.

Letters Patent No. 76,496, dated April 7, 1868.

IMPROVEMENT IN CARRIAGE-POLE.

*The Schedule referred to in these Letters Patent and making part of the same.*

TO ALL WHOM IT MAY CONCERN:

Be it known that I, V. N. MITCHELL, of Concord, in the county of Cabarras, and State of North Carolina, have invented a new and useful Improvement in Carriage-Pole; and I do hereby declare that the following is a full, clear, and exact description thereof, which will enable those skilled in the art to make and use the same. reference being had to the accompanying drawings, forming part of this specification, in which—

Similar letters of reference indicate corresponding parts.

This invention relates to an improvement in the construction of poles for carriages and vehicles of any kind, mounted on elliptic springs, and consists in forming the pole double, or making it of two pieces of timber, joined together at the point, and secured, side by side, back to the double-tree or splinter-bar, where the two hind ends of the pole spread, and are curved downwards, to be attached to the front axle of the carriage, in any suitable manner, so that the vehicle can be turned, and the pole be properly elevated, without coming in contact with the elliptic spring.

A represents the front axle of a vehicle, B the head-block, and C the lower part of an ordinary elliptic spring.

Figure 1:
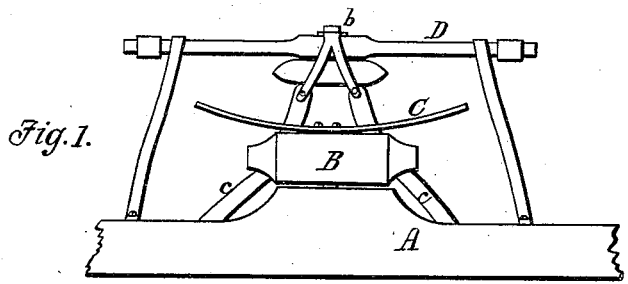
Figure 1 is a rear view of my improved double-curved carriage-pole.
Figure 2:
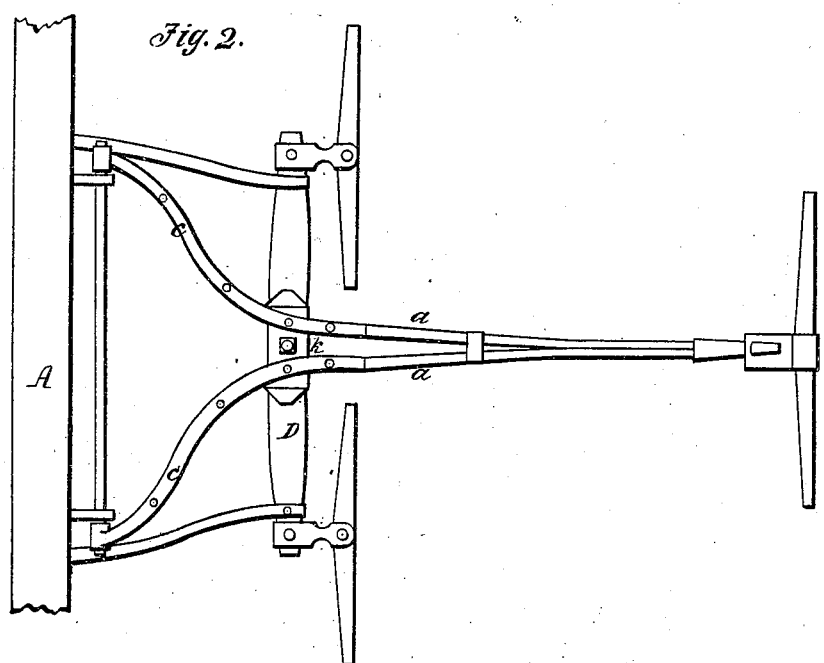
Figure 2 is a bottom view of the same.
Figure 3:
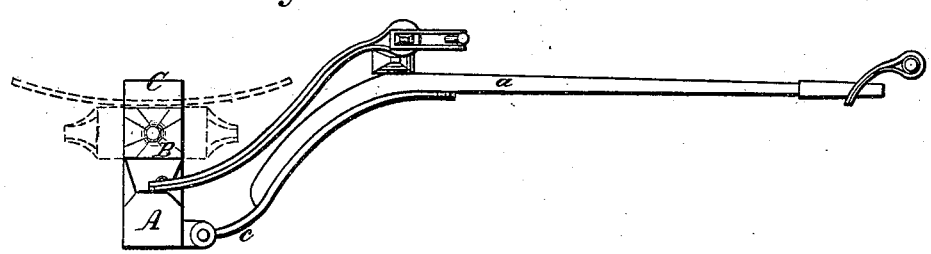
Figure 3 is a side view of the same, showing the curved form of the hind end of the pole below the elliptic spring, when the fore-wheels are turned round.

The tongue or pole is formed of two pieces of timber, *a a*, joined at the fore end, and fastened to a block, *b*, that is set under and bolted to the splinter-bar D. The rear ends of the two pieces *a a* are spread apart and curved downwards, as shown in figs. 2 and 3, in such a manner that the pole has the proper elevation, while the downward-curved ends allow the vehicle to be turned around without bringing the spring C in contact with them, as shown in fig. 3. The curved ends of the double pole are strengthened by iron straps, *c c*, on the under side, by which they are connected with the axle A.

Having described my invention, I claim as new, and desire to secure by Letters Patent—

The improved carriage-pole, formed of two pieces of timber, *a a*, firmly secured together at the front end, and spread and curved downwards at the hind ends, to prevent said pole from coming in contact with the elliptic springs C, when the vehicle is turned, as herein shown and described.

V. N. MITCHELL.

Witnesses:
JOSEPH MISENHEIMER,
JOHN L. SHINN.